United States Patent
Bonsen

(10) Patent No.: US 6,288,355 B1
(45) Date of Patent: Sep. 11, 2001

(54) SEAM WELDING METHOD AND APPARATUS

(75) Inventor: Jochen Bonsen, Rudolfstetten (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/406,670

(22) Filed: Sep. 27, 1999

Related U.S. Application Data

(62) Division of application No. 08/838,670, filed on Apr. 9, 1997, now Pat. No. 6,098,869.

(30) Foreign Application Priority Data

Apr. 22, 1996 (CH) .................................................. 01013/96

(51) Int. Cl.⁷ .................................................. B23K 11/06
(52) U.S. Cl. ................................ 219/81; 219/64; 219/161
(58) Field of Search ................ 219/64, 121.63, 219/121.64, 81, 83, 158, 161

(56) References Cited

U.S. PATENT DOCUMENTS

| | | | |
|---|---|---|---|
| 3,585,337 | * 6/1971 | Rudd | 219/67 |
| 3,627,964 | * 12/1971 | Morris | 219/64 |
| 3,834,010 | 9/1974 | Wolfe et al. | 29/477.7 |
| 4,070,887 | 1/1978 | Hankin | 72/52 |
| 4,389,556 | * 6/1983 | Nozawa et al. | 219/64 |
| 4,525,617 | 6/1985 | Saito . | |
| 4,675,489 | 6/1987 | Opprecht et al. | 219/64 |
| 4,719,329 | * 1/1988 | Matsuno et al. | 219/64 |
| 4,805,795 | * 2/1989 | Sato et al. | 219/64 |
| 4,842,186 | 6/1989 | Doyle et al. | 228/222 |
| 4,856,312 | 8/1989 | Alnauzer et al. | 72/133 |
| 5,011,064 | 4/1991 | Fuss | 228/151 |
| 5,344,062 | 9/1994 | Krengel et al. | 228/147 |
| 5,841,090 | * 11/1998 | Taina | 219/64 |

FOREIGN PATENT DOCUMENTS

| | | |
|---|---|---|
| 0 023 753 | 2/1981 | (EP) . |
| 0 289 745 | 11/1988 | (EP) . |
| 1 201 202 | 5/1970 | (GB) . |

\* cited by examiner

Primary Examiner—Clifford C. Shaw
(74) Attorney, Agent, or Firm—McCormick, Paulding & Huber LLP

(57) ABSTRACT

To weld a workpiece rounded from plane metal sheet on a seam welding machine, the workpiece is introduced into a preform (7) whose internal shape is approximately the same as the workpiece. Stops (11, 12, 14) are used to fix the workpiece in place in the preform, and the workpiece is then moved together with the preform (7) towards the welding rollers and welded. To this end the preform (7) is arranged on a platform (6) which in its turn is arranged on a movable carriage (3) in the welding machine (1). Welding with the preform makes it possible to weld together any desired sheet metal workpieces, including those which are not uniformly rounded because, for example, they are formed from blanks incorporating recesses.

6 Claims, 2 Drawing Sheets

SEAM WELDING METHOD AND APPARATUS

This application is a Div of Ser. No. 08/838,670 filed Apr. 9, 1997 now U.S. Pat. No. 6,098,869.

BACKGROUND OF THE INVENTION

The invention relates to a welding method in which a body substantially open at opposite ends is formed from a flat metal sheet and welded along its edges. For example, roller seam welding involves forming the body with overlapping edges and feeding the region of overlap to welding rollers. The invention further relates to apparatus for carrying out the method.

It is known to form hollow cylindrical bodies from flat metal sheets, e.g.. can bodies or ventilation pipes, the edges being butted against one another or an overlapping region of sheet metal being formed which is then joined by seam welding. As is known, seam welding involves the bodies to be welded being fed, preceding the welding zone, through a large number of rollers adapted to match the cross-section of the body being welded, with these rollers forming a passage which surrounds the body, or a guiding tool (so-called diabolo rolls according to Swiss Patent CH-A-671904). These roller guide tools maintain the shape of the body and press its longitudinal edges into a Z-shaped rail which takes care of the butt-jointed positioning or overlapping of the longitudinal edges which is required for welding. Seam welding then takes place by advancing the metal sheet through the guiding tools with the welding rollers operating on the overlap, and normally involves the use of wire electrodes.

In the case of metal sheets that incorporate reliefs or recesses, or that are composed of different thicknesses of material or else have been cut out in such a way that the end surface of the rounded body is not at right-angles to the longitudinal axis, or direction of the weld seam, these conventional roller guiding tools have been known to cause problems since there is no guarantee that the workpiece will be correctly guided and centered. Therefore to date such welds have not been produced using the conventional welding machines.

It is therefore an object of this invention to devise a method of welding bodies, more particularly sheet metal casings, by which it is possible to weld a body formed from a sheet metal blank of any desired shape and even metal sheet incorporating recesses or differences in material thickness or hardness.

SUMMARY OF THE INVENTION

In the case of the method of welding a body substantially open at opposites ends this object may be achieved by introducing the body into a preform, holding it therein and feeding it together with the preform to the welding station.

The fact that the body is held in a preform and fed along with the preform to the welding station means that it is also a straightforward matter to weld bodies formed from metal sheets incorporating the shaping, recesses, etc. referred to above.

A welding apparatus to achieve this object, comprises welding rollers and wire electrodes for welding a butt seam or a lap seam. Additional features include at least one preform (7) for the introduction of at least one preformed body to be welded, clamping means (11,12,14) for holding the body in the preform, and driving means for driving the preform in the direction of welding.

BRIEF DESCRIPTION OF THE DRAWINGS

Exemplary embodiments of the invention will now be described in more detail with reference to the drawings, wherein.

DETAILED DESCRIPTION OF THE PREFERRED EMBODIMENTS

Figure 1:
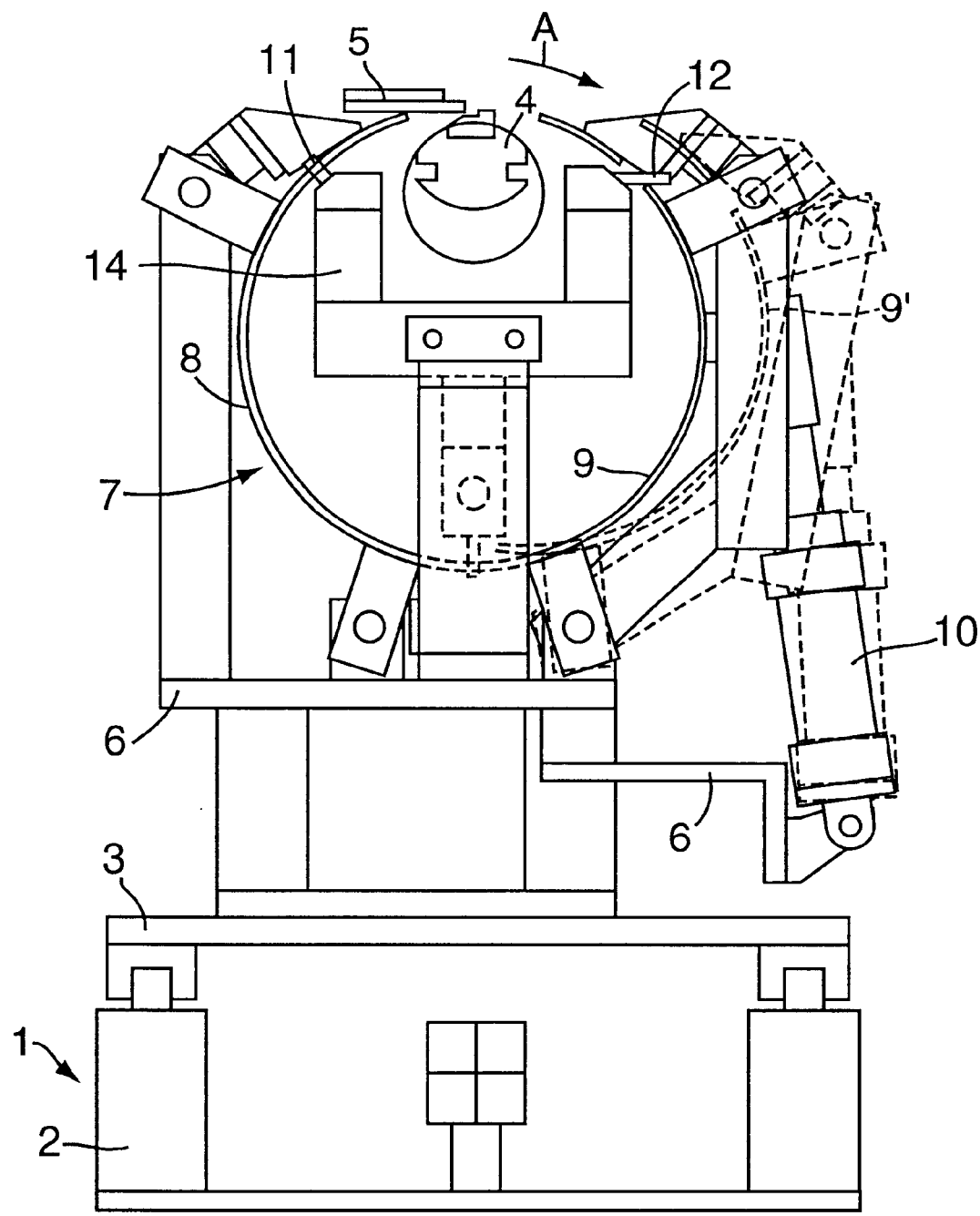
FIG. 1 shows a frontal view of a preform for carrying out the method.

FIG. 1 is a longitudinal view of a welding machine, i.e.. looking towards the seam being welded. The welding machine 1 has a machine frame 2 on which is disposed a movable carriage 3. Also visible in this figure are the lower arm 4 of the welding machine and the Z-rail 5. In relation to the chosen view the welding rollers; are arranged in conventional manner at the front, above the plane of the drawing, with the results that a can body with its overlap situated in the Z-rail can be welded by the inner and outer welding rollers. As there is nothing new about this design of seam welding machine, further details will be dispensed with here.

The carriage 3, which carries the preform 7 on a platform 6, is arranged so as to be able to move along the machine frame 2. This enables the preform to quickly and easily be exchanged for another preform designed for a workpiece of a different shape. The internal shape of the preform approximately matches the body being produced. In the example depicted, the preform 7 comprises two parts 8,9 in the form of shells. The part 8 is fixed and the part 9 can be swivelled away to a certain extent to open the preform; in the figure the part 9 is shown in the closed position but it is also indicated in the open position at 9'. The opening and closing of the preform 7, or rather the swivelling back and forth of the part 9 can be effected using a hydraulic cylinder 10 which is fixed by one end to the platform 6 and by its other end to the part 9.

In accordance with the invention the procedure for welding a body is as follows: a rounded body formed from a metal sheet is introduced into the opened preform straight from the rounding apparatus (not shown) which is situated above the preform 7. Rolled by the shaping rolls of the rounding apparatus, the body is introduced diagonally from above into the opened preform, as indicated by the arrow A. The body comes to rest against the inner wall of the preform 7. When the preform is closed by means of the cylinder 10, the rounded body assumes the desired position, corresponding to the internal shape of the preform 7, and the longitudinal edges of the body enter the slots in the z-rail 5 in the conventional matter. Instead of introducing the body diagonally from above into the preform 7 straight from the rounding apparatus, it is also possible to introduce manually a previously rounded body into the preform In this instance the body is introduced from the front, i.e.. in the direction looking towards the drawing.

As stated, when the preform is closed the body is arranged with its longitudinal edges in the Z-rail and is held along its circumference by the preform. Pivotable stops 11 and 12 are preferably provided in the front region of the preform, and once the body has been introduced into the preform these stops can be moved into place. While the body is being introduced the stops are withdrawn outside the preform, so as not to interfere with the introduction of the body, particularly when it has an irregular shape. The position of the stops 11 and 12 can be adjusted longitudinally in order to adapt the stops to the particular shape of the body. As stated, after the preform has been closed the stops are moved into position in the preform and a further travelling. Stop 14 moves up against the inserted sheet from behind and pushes it against the frontal stops 11 and 12. In this way the shaped body is centered and held longitudinally in the preform 7, regardless of whether inner regions have been removed. The workpiece to be welded is thus now arranged in the preform 7 and fixed in place there.

The entire preform 7 is now moved forwards by means of the carriage 3, with the result that the overlapping longitudinal edges of the workpiece to be welded pass between the welding rollers. The welding rollers can be used to further advance the workpiece with the preform 7, i.e.. the carriage 3 would then be freely movable and only moves forwards due to the traction exerted by the welding rollers. Preferably, however, the preform and the carriage are driven at the set welding speed during the welding operation. This action of driving the carriage and hence the preform, with the workpiece, relieves the load on the welding rollers and improves the quality of the welded seam, for there is no risk of slippage between the welding rollers and the workpiece.

At the end of the welding operation the stops 11 and 12 are again retracted from the preform and the stop 14 is moved back again towards the rear and the preform is opened so that the welded workpiece can be removed. The preform is then moved back into its rear extreme position and is ready to be loaded up with a further shaped body. It is also possible, however, to provide a plurality of carriages with preforms which are deployed in succession, and once it is empty a preform is moved back to the rear along a separate return path for reloading. Likewise it is possible for a carriage to be made sufficiently long for it to be simultaneously loaded with a plurality of preforms.

Figure 2:
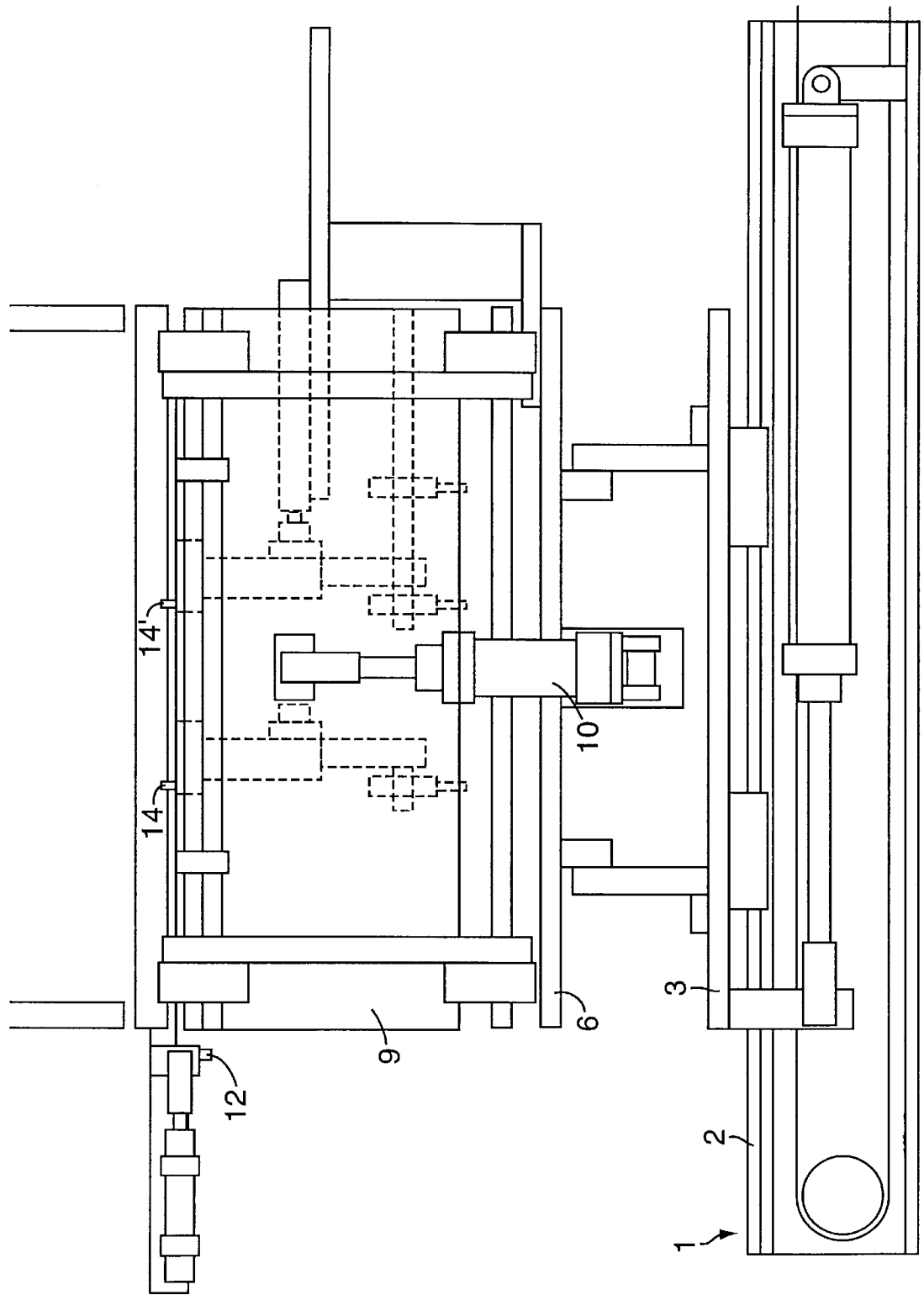
FIG. 2 shows a side view of the preform seen in FIG. 1.

FIG. 2 is a side view of the equipment seen in FIG. 1, and the same reference numerals are used to designate the same parts. The rear stop is shown in two positions, 14 and 14'. The preform makes it possible to clamp, center and weld cylindrical or differently shaped can bodies, and in the case of differently shaped bodies the inner shape of the preform must be adapted to the desired workpiece shape in such a manner that the edges to be welded pass into the defined welding position and remain fixed there. At any rate the preform, unlike conventional calibrating rolls, makes it possible to form and weld any desired shape of blank. Even bodies that incorporate recesses or differences in material thickness and hardness and are therefore rounded irregularly and cannot be guided and centered using the conventional roller guiding tools can readily be controlled in the preform and fed in an accurately defined position to the welding roller.

Preferably, as stated, a part of the preform is opened for loading it, thus facilitating rounding or loading by hand. Once the preform is closed and put under load, differences in the roundness of the can bodies due to the shape of the blank or to recesses in the bodies are compensated again and the workpiece moulds itself to the inner wall of the preform. The aforesaid stops are preferably arranged at the top of the preform and are adapted to be operated pneumatically to prevent the workpiece from shifting in the preform and to allow it to be exactly centered longitudinally. The rear stop 14, which preferably has a very long travel, allows the preform to be readily adapted to different heights of can body.

The preform offers the additional advantage of allowing the restrictive blank tolerances required in the case of conventional guiding tools to be greatly increased, for the preform is not sensitive to such tolerances, unlike the conventional roller guiding tools. It is therefore also possible to weld workpieces exhibiting small differences in diameter without the time-consuming necessity of resetting the tools, as, for example, is the case with telescoping tubular parts, where one part must have a correspondingly smaller diameter in order to be able to fit inside the other part. As stated, unlike in the case of roller guiding tools, only one preform is required, which can be used for can bodies of slightly different diameter.

What is claimed is:

1. Welding apparatus, comprising welding rollers and wire electrodes for welding a butt seam or a lap seam, said welding apparatus including at least one preform for the introduction of at least one preformed body to be welded, clamping means for holding the body in the preform, and driving means for driving the preform in the direction of welding, and wherein said preform extends in the direction of the welding.

2. Welding apparatus, comprising welding rollers and wire electrodes for welding a butt seam or a lap seam, said welding apparatus including at least one preform for the introduction of at least one preformed body to be welded, clamping means for holding the body in the preform, and driving means for driving the preform in the direction of welding, and wherein the preform is made up of two parts, one part being pivotable in order to open and close the preform.

3. Welding apparatus, comprising welding rollers and wire electrodes for welding a butt seam or a lap seam, said welding apparatus including at least one preform for the introduction of at least one preformed body to be welded, clamping means for holding the body in the preform, and driving means for driving the preform in the direction of welding, and wherein the clamping means comprise at least two frontal stops which are pivotable into and out of the interior of the preform, and at least one rear stop which is adjustable longitudinally along the preform.

4. Welding apparatus, comprising welding rollers and wire electrodes for welding a butt seam or a lap seam, said welding apparatus including at least one preform for the introduction of at least one preformed body to be welded, clamping means for holding the body in the preform, and driving means for driving the preform in the direction of welding, and wherein the driving means is arranged to be driven at a forward speed adapted to the welding feed speed of the apparatus.

5. Welding apparatus, comprising welding rollers and wire electrodes for welding a butt seam or a lap seam, said welding apparatus including a first exchangeable preform for the introduction of a first body to be welded, clamping means for holding the body in the preform, and driving means for driving the preform in the direction of the welding, and wherein said first exchangeable preform can be exchanged for a second exchangeable preform for the introduction of a second body to be welded, wherein said first body and said second body are shaped different from one another, and said first exchangeable preform has an inner shape that approximately matches said first body and said second exchangeable preform has an inner shape that approximately matches said second body.

6. Apparatus according to claim 5, wherein a plurality of carriages are provided with at least one preform in each case.

* * * * *